A. M. OLDS.
Lumber Measure.
No. 45,741.
Patented Jan. 3, 1865.
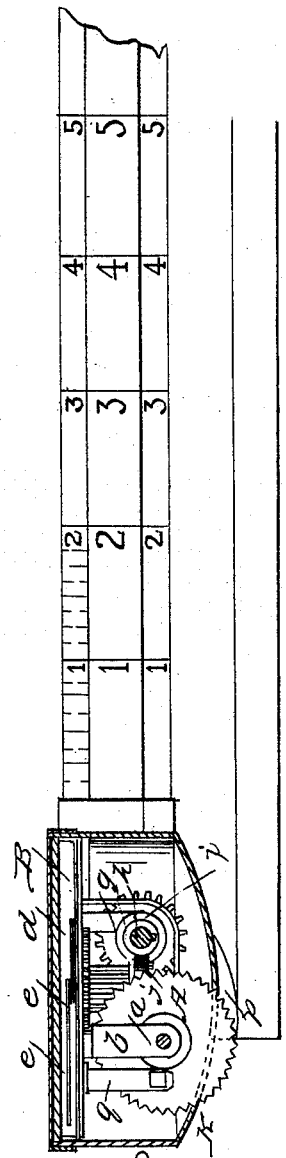
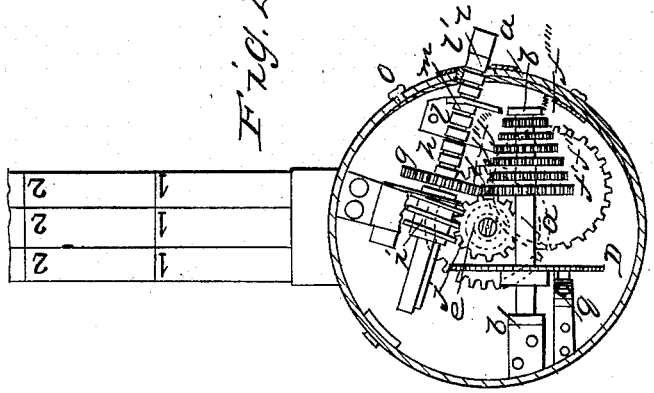
Witnesses:
Thee Tusch.
Wm. T. McNamara
Inventor:
A. M. Olds

UNITED STATES PATENT OFFICE.

A. M. OLDS, OF CHICAGO, ILLINOIS.

IMPROVEMENT IN LUMBER-MEASURES.

Specification forming part of Letters Patent No. 45,741, dated January 3, 1865.

*To all whom it may concern:*

Be it known that I, A. M. OLDS, of Chicago, in the county of Cook and State of Illinois, have invented a new and Improved Lumber-Measure; and I do hereby declare that the following is a full, clear, and exact description thereof, which will enable others skilled in the art to make and use the same, reference being had to the accompanying drawings, forming part of this specification, in which—

Figure 1 is an inverted plan of this invention, partly in section. Fig. 2 is a sectional side elevation of the same.

Similar letters of reference indicate like parts.

The object of this invention is to produce a lumber-measure which, with a measuring-disk of uniform diameter, is capable of indicating the number of superficial feet contained in boards of different lengths. This purpose is effected by the use of a nest of wheels, of gradually-decreasing diameters, mounted on the shaft of the measuring-disk, or otherwise connected with the same, and applied in combination with a sliding shaft carrying a gear-wheel and endless screw, or other equivalent devices, through which the motion of the shaft of the measuring-disk is transmitted to the arbor carrying the index-hands in such a manner that simply by adjusting the sliding shaft the instrument can be set for boards of different lengths, and that without changing the measuring-disk or its diameter the number of superficial feet contained in boards of different lengths can be registered. A shoe which projects from the bottom of the case and terminates under the center of the measuring-disk enables the operator to start at the correct point without paying any attention to the position of the disk in relation to the edge of the board to be measured, and a suitable friction device applied to the measuring-disk, or to parts connected with it, causes the working parts of the instrument to stop as soon as the disk has passed the board, and prevents the momentum of the disk and wheels from carrying the index-hands beyond the proper point.

Lumber-measures of that construction on which a patent has been granted to Charles Fleming, February 6, 1861, or of that patented by me, August 9, 1864, are so arranged that in order to adjust the instrument for boards of different lengths the measuring-disk must either be removed and replaced by one of different diameter, or the diameter of the measuring-disk must be changed, and it is necessary either to carry the requisite number of disks or to arrange the disk with great care so that its diameter can be changed. These defects are overcome by my present invention, in which with the same measuring disk the number of superficial feet in boards of different lengths can be registered.

A is the measuring-disk, which is secured to an arbor, $a$, that has its bearings in brackets $b$, which are firmly attached to the under surface of the dial-plate B. This dial-plate is marked with a suitable scale to indicate the number of superficial feet contained in a board, and it is provided with two or more index-hands, $c$ $d$, to give the units, tens, hundreds, &c., as may be desirable, which are secured to a vertical arbor, $e$. The motion imparted to the arbor $a$ by the action of the measuring-disk A, as the same is moved across a board, is transmitted to the arbor $e$ by means of a nest of wheels, $f f' f''$, &c., which are secured to the arbor of the measuring-disk, and each of which can be brought in gear with a cog-wheel, $g$, on a longitudinal sliding shaft, $h$, which passes through a worm, $i$, that gears in a worm-wheel, $j$, on the arbor $e$, as shown in Fig. 1 of the drawings. A suitable feather or key projecting from the sliding shaft $h$ compels the worm to rotate with said shaft.

The entire mechanism is inclosed in a case, D of sheet metal or other suitable material, and this case is provided with a suitable slot, $k$, in its bottom, through which the measuring-disk projects, and with a hole, $l'$, in its side to admit the sliding shaft $h$. This shaft is provided with a series of notches, $l$, at suitable distances apart to correspond to the distances of the wheels $f f' f''$, &c., on the arbor $a$, and whenever one of said notches is made to catch in the edge of the semicircular bearing $m$ the shaft $h$ is held in position and prevented from moving in a longitudinal direction. The outer end of shaft passes through a slide, $n$, which is adjustable on the outside of the case by a spring-button, $o$. If this slide is moved in the direction of the arrow marked near it in Fig. 1 of the drawings, the shaft $h$ is thrown out of gear with the edge of the semicircular bearing $m$, and it can now be moved in a longitudinal direction, and when it has been brought in the desired position the slide $n$ is moved back and the shaft $h$ is locked. By this arrangement the wheel $g$ can be thrown in gear with either of the wheels $f\ f'\ f''$, &c. without removing any part of the instrument The case D is provided with a shoe, $p$, which projects from its bottom in close proximity to the measuring-disk, and which extends to a point exactly under the center of the arbor $a$. By this shoe the measuring-disk is prevented from coming in contact with the board, to be measured before the center of the arbor $a$ has arrived exactly over the edge of said board and inaccuracies in the operation are avoided. Furthermore, the instrument can be drawn across a board without paying any attention to the position of the disk, and much time is saved.

A friction device, $q$, which acts on the measuring-disk or on any part of the working mechanism, causes the index-hands and the entire mechanism to stop as soon as the disk has passed the board, and prevents the momentum from carrying the working parts of the registering apparatus beyond the proper point.

The instrument can thus be worked with great rapidity without producing an erroneous result.

If desired, the instrument may also be used to measure the length of timber, by setting the same for measuring ten-foot stuff. If drawn over the length of the timber, every revolution of the long index-hand will be ten feet.

Having thus described my invention, I claim as new and desire to secure by Letters Patent—

1. A lumber-measure arranged substantially as described, so that with a measuring-disk of uniform diameter the superficial feet of boards of different lengths can be determined.

2. The nest of wheels $f\ f'\ f''$, &c., applied in combination with the disk A, sliding shaft $h$, and index-hands $c\ d$, substantially as and for the purpose set forth.

3. The shoe $p$, in combination with the measuring disk A, constructed and operating substantially as and for the purpose described.

A. M. OLDS.

Witnesses:
 THEO. TUSCH,
 C. L. TOPLIFF.